United States Patent
Proudler

(10) Patent No.: US 8,370,610 B2
(45) Date of Patent: Feb. 5, 2013

(54) REMOTE CONFIGURATION OF COMPUTING PLATFORMS

(75) Inventor: Graeme John Proudler, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/405,098

(22) Filed: Feb. 24, 2012

(65) Prior Publication Data

US 2012/0159157 A1    Jun. 21, 2012

Related U.S. Application Data

(62) Division of application No. 12/407,642, filed on Mar. 19, 2009, now Pat. No. 8,127,124.

(51) Int. Cl.
*G06F 9/00* (2006.01)
*G06F 21/00* (2006.01)
*G06F 11/30* (2006.01)
*G06F 15/16* (2006.01)
*G06F 9/445* (2006.01)
*H04L 29/06* (2006.01)

(52) U.S. Cl. ............ 713/1; 713/150; 713/182; 713/189; 709/220; 717/171; 717/176

(58) Field of Classification Search ............... 713/1, 150, 713/182, 189; 709/220; 717/171, 176
See application file for complete search history.

(56) References Cited

U.S. PATENT DOCUMENTS

| 7,526,649 | B2 * | 4/2009 | Wiseman et al. | 713/175 |
|---|---|---|---|---|
| 7,747,862 | B2 * | 6/2010 | Ovadia | 713/176 |
| 7,913,086 | B2 * | 3/2011 | Kostiainen et al. | 713/176 |
| 2005/0149729 | A1 * | 7/2005 | Zimmer et al. | 713/168 |
| 2005/0223221 | A1 | 10/2005 | Proudler et al. | |
| 2007/0136580 | A1 * | 6/2007 | Anand et al. | 713/168 |

FOREIGN PATENT DOCUMENTS

WO    WO 2008026086 A2 *    3/2008

OTHER PUBLICATIONS

Trusted Computing Group, TPM Main, Part 1, Design Principles, Jul. 9, 2007, pp. 1-170.
Trusted Computing Group, TPM Main, Part 2, TPM Structures, Oct. 26, 2006, pp. 1-186.
Trusted Computing Group, TPM Main, Part 3, Commands, Oct. 26, 2006, pp. 1-318.

* cited by examiner

*Primary Examiner* — Stefan Stoynov

(57) ABSTRACT

An embodiment of the invention relates to a computing platform having an attribute that is configurable by a remote system, the computing platform storing a first verifier for verifying that a message is from a trusted remote source and being operable to: acquire a second verifier from a trusted remote source, including by verifying the second verifier using the first verifier, the second verifier being usable for verifying that a message is from a remote configuration system that is trustable to configure the attribute; acquire a configuration setting from the remote configuration system, including by verifying the configuration setting using the second verifier; and configure the attribute according to the configuration setting.

8 Claims, 6 Drawing Sheets

REMOTE CONFIGURATION OF COMPUTING PLATFORMS

CROSS-REFERENCE TO RELATED APPLICATION

This application claims priority to and is a divisional of U.S. patent application Ser. No. 12/407,642, filed on Mar. 19, 2009, now U.S. Pat. No. 8,127,124 and entitled "REMOTE CONFIGURATION OF COMPUTING PLATFORMS."

FIELD

The present invention relates to computing platforms and, in particular, but not exclusively, to remote configuration of trusted computing platforms.

BACKGROUND

A significant consideration in interaction between computing entities is trust—whether a foreign computing entity will behave in a reliable and predictable manner, or will be (or already is) subject to subversion. Trusted computing platforms (trusted platforms) are computer systems which contain a trusted entity in the form of a hardware trusted component (or device) at least logically protected from subversion that have been developed by the companies forming the Trusted Computing Group (TCG). The TCG develops specifications in this area, for example the "TCG TPM Specification" Version 1.2, which is published on the TCG website. The implicitly trusted components of a trusted platform enable measurements of a trusted platform and are then able to provide these in the form of integrity metrics to appropriate entities wishing to interact with the trusted platform. The receiving entities are then able to determine from the consistency of the measured integrity metrics with known or expected values that the trusted platform is operating as expected.

Many trusted platforms, including desktop personal computers and portable laptop/notebook computers, are manufactured by original equipment OEMs (OEM) and shipped with hardware trusted components on board. The computers and the trusted components typically have a default configuration when purchased from new, and need to be configured for operation by the buyer. Different classes of buyer, for example, individuals, small business or large enterprises (to name just a few) tend to have widely differing configuration requirements, and operating infrastructures, into which a trusted platform may need to be integrated. For example, irrespective of infrastructure, a trusted component needs to be 'switched on', in order to operate. Such trusted platforms typically have specially adapted trusted BIOS programs that are user-configurable to set or reset an operating state of the trusted components (for example by setting or un-setting various flags) on power up or reset (boot or reboot, or waking from a sleep state), whereby a trusted platform can be configured to operate in a trusted state (wherein the trusted component is active and started) and in a less trusted or untrusted state (wherein the trusted component is inactive or active and not started). By convention, for security and privacy reasons, such trusted platforms are shipped by OEMs with a default BIOS setting whereby, on booting, the trusted component is inactive (that is, it can't be used to enhance the security of the platform in operation), unless an operator who is physically present interrupts the boot process (for example, by pressing a particular key or combination of keyboard keys) to enter a setup routine in order to access configuration settings to activate the trusted component. A similar operation can be used to deactivate a trusted component. This is a requirement irrespective of whether the owner is an individual or an enterprise. Another requirement, particularly for platforms purchased by enterprises, is to enroll the platform into a public key infrastructure (PKI) of the enterprise. Enrollment as such is known and typically requires a complicated set of cryptographic interactions between the IT department and the trusted platform. While it is essential for a trusted platform to be trustworthy, and procedures for configuring the platform and/or trusted component need to be equally trustworthy in order not to reduce the trustworthiness, it is also desirable to provide mechanisms to enable trusted platforms to be configured more easily.

SUMMARY

According to a first aspect, the present invention provides a computing platform having an attribute that is configurable by a remote system, the computing platform storing a first verifier for verifying that a message is from a trusted remote source and being operable to: acquire a second verifier from a trusted remote source, including by verifying the second verifier using the first verifier, the second verifier being usable for verifying that a message is from a remote configuration system that is trustable to configure the attribute; acquire a configuration setting from the remote configuration system, including by verifying the configuration setting using the second, verifier; and configure the attribute according to the configuration setting.

According to a second aspect, the present invention provides a method of configuring an attribute of a computing platform, including: receiving a signature verification key and a signature of the signature verification key generated, using a signing key of a trusted remote source; verifying, using a pre-installed signature verification key of a trusted remote source, that the received signature was generated by a signing key of a trusted remote source and accepting that the received signature verification key belongs to a trustable remote configuration system; receiving a configuration setting and a signature of the configuration setting; verifying, using the received signature verification key, that the signature was generated by a signing key of a trustable remote configuration system; and configuring an attribute of the computing platform using the received configuration setting.

According to a third aspect, the present invention provides a computing platform storing a verifier for verifying messages from a remote computer system and being operable to: generate an AIK key pair; send to the remote computer system a message comprising a public key portion of the AIK key pair and evidence that the public key portion of the AIK key pair originates from the computing platform; and store an AIK certificate, which is received from the remote system and is associated with the AIK key pair.

BRIEF DESCRIPTION OF THE DRAWINGS

Embodiments of the invention will now be described, by way of non-limiting example, with reference to the accompanying diagrammatic drawings of the prior art and of embodiments of the invention, in which.

DETAILED DESCRIPTION

Figure 1:
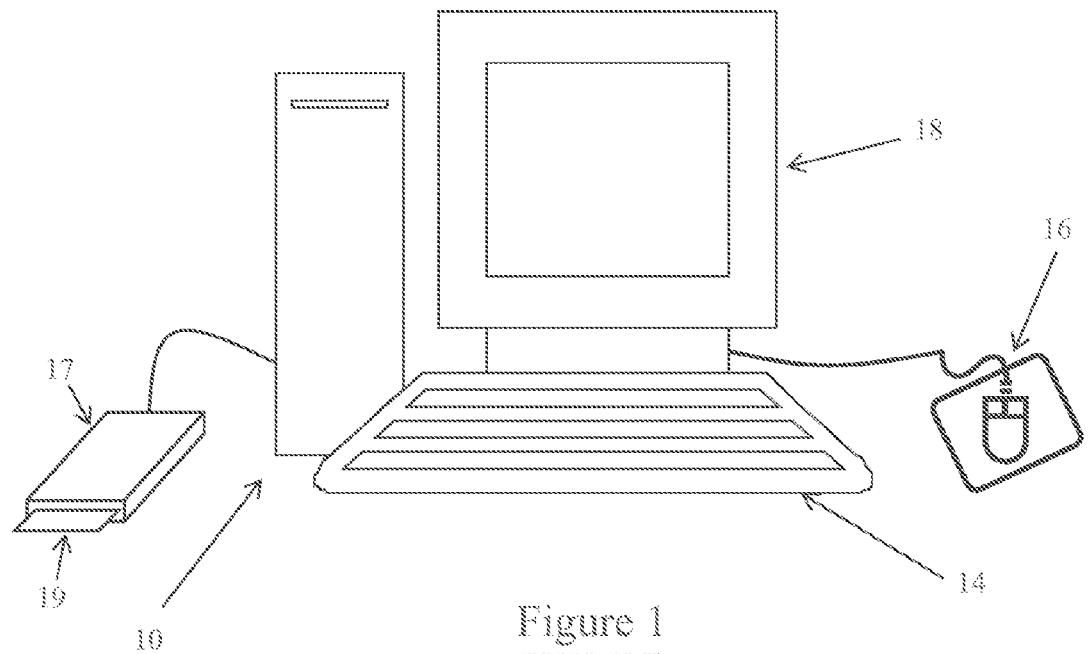
FIG. 1 is a schematic diagram illustrating an exemplary prior-art computing platform.

Basic Input Output System (BIOS) programs are supplied by the OEM and typically execute at platform initialisation. However, BIOS programs and, indeed, other programs supplied by an OEM, may in addition, or alternatively, execute after an operating system (OS) is installed in a platform. Such programs are System Management functions that can use System Management Memory (SMM) and cars be invoked via System Management Interrupts (SMI), which typically take a higher priority than other interrupts. SMM typically comprises a dedicated memory space, which is not visible to (and therefore not addressable directly by) the OS and application software. While embodiments of the present invention to be described hereinafter refer to a 'boot process', or a 'trusted boot process' (each typically including a BIOS), in order to perform certain operations before an OS is invoked, it will be understood that the operations may in addition, or alternatively, be caused, or performed by System Management functions, and or by the OS or applications in cooperation with System Management functions. In particular, it should be understood that, although (typically) it may be a BIOS that obtains permission from a user to perform an operation (as will be described), for example, the operation may be performed using System Management functions, after die OS is executing on the platform. It is conceivable that, in alternative embodiments, other software (such as a hypervisor or software that acts as a dedicated appliance) might be used in addition, or alternatively, to obtain permission.

Those skilled in the art will be aware that BIOS programs may communicate with and/or initialise System Management functions. Those skilled in the art will also be aware of the functional constraints that exist because System Management functions are orthogonal to the OS, in the sense that either System Management functions execute or the OS executes.

As used herein, the term "computing platform" is to be understood as encompassing any apparatus capable of effecting computation and is not limited, to computers; for example, digital cellular equipment (including mobile telephones) and personal digital assistants (PDAs) have substantial computing capability and are within the scope of the term "computing platform"; and the term 'trusted platform' is equally broad. In addition, the term computing platform herein includes, except where the context otherwise requires, a virtual computing platform environment, which is substantially independent (e.g. encapsulated or compartmentalised) of other such computing environments, which all reside on a common physical computing platform, under the control of a hypervisor. A fuller description of various forms of trusted platform of this type can be found in US published patent application US 2005/0223221, incorporated herein by reference.

A trusted entity that imbues trust upon a trusted platform can be embodied as a hardware component (which may include a program-controlled processor) or in software for execution by a main processor of the platform (in which case it is usually referred to as a 'virtual' trusted, entity or, in the case of a TPM, a virtual TPM). In practice, virtual trusted entities are normally provided on platforms that have a basic hardware trusted component for the basic platform environment but which employ further trusted entities for virtual environments created on the platform. A hardware trusted component is usually physically bound to the platform with which it is associated whereas a software trusted entity is logically bound to the platform with which it is associated. It is, of course, also possible to implement a trusted entity as a combination of hardware component and software intended for execution on the platform. The functionality of the trusted entity can be distributed between multiple devices (in the case of a hardware embodiment) or code blocks (in the case of a 'virtual' embodiment). Embodiments of the present invention will be described with reference to a hardware trusted component, but relate equally to virtual or software trusted entities. Unless the context dictates otherwise, a reference to a trusted component (in the description of appended claims) applies equally to a software or virtual trusted entity.

A hardware trusted component preferably consists of one physical component that, is tamper-resistant. Techniques relevant to tamper-resistance are well known to those skilled in the art of security. These techniques include methods for resisting tampering (such as appropriate encapsulation, of the trusted, entity), methods for detecting tampering (such as detection of out of specification voltages, X-rays, or loss of physical integrity in the trusted entity casing), and methods for eliminating data when tampering is evident. As regards a 'virtual' trusted entity, although software may not afford such a high degree of tamper-resistance as a hardware device, this may be compensated for by additional protection measures. For example, the software code may include self-test functions, to check the integrity of the trusted functionality.

In the present context "trust" is the expectation that a device will behave in a particular manner for a specific purpose (i.e. the device is trustable), and a "user" can be a local user or a remote user such as a remote computing entity.

An example of a prior art trusted computing platform is illustrated in the diagram in FIG. 1. A platform 10 is shown as a so-called personal computer and is entirely conventional in appearance—it has associated the standard features of a keyboard 14, mouse 16 and visual display unit (VDU) 18, which provide the physical 'user interlace' of the platform. In addition, the platform may have associated security devices, such as a smart card reader 17 for reading a smart card 19. Such security devices provide the platform with the capability to enact two-factor authentication. Additional or alternative security devices (not shown) may include biometric readers, such as finger print readers or iris readers. The platform 10 is arranged, to run a standard OS such as Microsoft™ Windows XP™.

Figure 2:
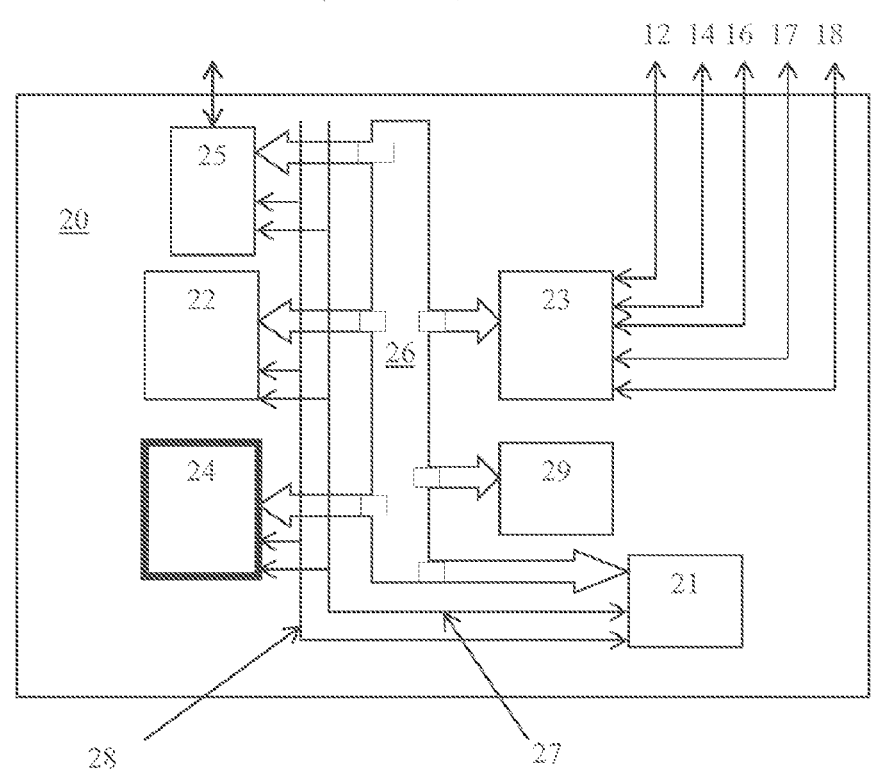
FIG. 2 is a block diagram indicating functional elements present on the motherboard of a prior-art trusted computing platform.

As illustrated in FIG. 2, the motherboard 20 of the trusted platform 10 includes (among other standard components) a main processor 21, main memory 22, a hardware trusted component 24 (such as a hardware TPM), a data bus 26 and respective control lines 27 and address lines 28, BIOS memory 29, typically comprising non-volatile RAM (NV-RAM), containing the BIOS program for the platform 10, an Input/Output (IO) device 23, which controls interaction between the components of the motherboard and the keyboard 14, the mouse 16 and the VDU 18, and an I/O device 25, for example an Ethernet controller, for controlling communications with remote devices or systems. The main system memory 22 is typically random access memory (RAM). In operation, the platform 10 loads the OS, in this case Windows XP™, into RAM from, hard disk (not shown). Additionally, in operation, the platform 10 loads the processes or applications that may be executed by the platform 10 into RAM from hard disk (not shown). The mounting of the trusted component 24 on the mother board serves to bind it to the platform.

Typically, in a personal computer, the BIOS program, is located in a special reserved memory area, such as the upper 64K of the first megabyte of the system memory (addresses FØØØh to FFFFh), and the main processor is arranged to look at this memory location first, in accordance with an industry wide standard. A significant difference between the trusted platform under discussion and a conventional platform is that, after reset, the main processor is initially controlled by CRTM code (which in the present example comprises hash function code stored in the trusted component 24) which then hands control over to the platform-specific trusted BIOS program, which in turn initialises all input/output devices as normal. After the BIOS program has executed, control is handed over as normal by the BIOS program to an OS program, such as Windows XP™, which is typically loaded into main memory 22 from a hard disk drive (not shown). Hereinafter, a trusted BIOS program in combination with the CRTM code, and, indeed, any other kind of bootstrap code in a trusted platform that is responsible for taking measurements and initialising hardware before an OS takes over, will be referred to herein as the 'trusted boot process'.

In general terms, a trusted platform provides for trustable platform integrity measurement and reporting and to this end has a plurality of shielded locations, that is, places (memory, registers, etc.) where it is safe to operate on sensitive data. Integrity measurement is the process of obtaining integrity metric measurements of a platform (that is, measurements of platform characteristics that affect the integrity—trustworthiness—of the platform) and putting the measurements (here taken to encompass derivative values such as digests) into shielded locations; in TCG parlance, the shielded locations used for storing integrity metrics are referred to as Platform Configuration Registers or "PCRs". The values held in the PCRs are reportable integrity metric values. Integrity reporting is the process of attesting to integrity metrics recorded in PCRs in a way that associates the metrics with the platform concerned. A trusted computing platform may also provide, in addition to shielded locations, trustable storage for securely storing data in encrypted form and for ensuring that access to this data only occurs in a named environment. For example, according to TGC specifications, an opaque blob (or simply 'blob') in general comprises stored data which is cryptographically sealed to a particular platform state. The foregoing trusted features will normally involve the use of cryptographic functions.

An operator can verify the correct operation of a trusted computing platform, for example, before exchanging data with the platform, by requesting the trusted platform to provide one or more integrity metrics. The operator receives the integrity metric or metrics, and compares them against values which it believes to be true (these values being provided by a trusted party "TP" that is prepared to vouch for the trustworthiness of the platform or by another party the user is willing to trust). If there is a match, the implication is that at least part of the platform is operating correctly, depending on the scope of the integrity metric. If there is no match, the assumption is that the entire platform has been subverted and cannot be trusted (unless isolation technologies are employed to restrict the scope of what cannot be trusted).

Once an operator has established trusted operation of the platform, he exchanges data with the platform. For a local operator, the exchange might be by interacting with some software application running on the platform. For a remote operator, the exchange might involve a secure transaction. In either case, the data exchanged is preferably 'signed' by the trusted platform. The operator can then have greater confidence that data is being exchanged with a platform whose behaviour can be trusted. Data exchanged may be information relating to some or all of the software running on the computer platform.

As was alluded to in the introduction, a newly purchased trusted platform is typically configured so that the trusted component is not operational and needs to be activated. In existing implementations, a misted platform OEM produces a trusted platform, including installing a trusted component, a trusted CRTM and an identifier (ID) of the platform. Enterprise customers frequently install platform firmware/software that is designed to cooperate with an enterprise management system, and accept and store verification passwords and/or keys provided by the enterprise management system, which can be used, for verification of messages from an IT department computer to the trusted platform. In some existing implementations, the IT department computer provides the trusted platform with a configuration setting, comprising a trusted component operating state indicator I, in a message authenticated by the relevant passwords and/or keys. An advantage of this implementation is the ability of an IT department to configure the operating state of a trusted component remotely and automatically, without needing the physical presence of an IT department operator. In an enterprise environment in which there may be tens of thousands of computers, many or indeed all of which may be trusted platforms, the ability to enact remote and automatic trusted component operating state configuration saves a significant amount of time and effort. Meanwhile an advantage to the OEM is that it can ship exactly the same platform (in terms of setup and configuration) to all customers, and there is reduced pressure from enterprises to insist that platforms must be pre-configured to meet their needs.

Embodiments of the present invention concern a more rigorous method of delivering a trusted component operating state indicator I. Other embodiments of the present invention in addition, or alternatively, concern methods of operating a trusted platform, to acquire a certificate for an Attestation Identity Key (AIK), which can be used with both existing, known implementations and with the more rigorous method of delivering a trusted component operating state indicator I.

A trusted boot process operable according to embodiments of the present invention will now be described with reference to the functional block diagram in FIG. 3. The boot process can be applied in general, as will be described below, to obtain information from a trusted remote source, such as an OEM, that enables the trusted boot process (or, more generally, any platform, irrespective of whether or not it is a trusted platform containing a trusted component) to trust one or more other remote computers. The other remote computer(s), in the examples described below, are within an enterprise network, into which the platform is to be enrolled. However, the other remote computer(s) may be any computer that, is trusted by the OEM or other trusted source, for example, to act as a remote configuration system, permitted to configure an attribute of the platform itself. According to embodiments of the invention, the trusted boot process may be arranged to configure an attribute of a respective trusted platform on the basis of trusted communications with remote systems. In one example that will be described, attributes are trusted attributes, for example, including the operating state of a trusted component. In another example to be described, attributes include the installation of an Attestation identity Key (AIK) certificate. In communications with third parties, rather than using a single private Endorsement Key PRIVEK to communicate with all third parties, a trusted component (such as a TPM) typically uses a private key that is part of a so-called AIK pair dedicated to interactions with specific third parties; the reason for this is that, if only the EK is employed, it can be used to link transactions involving the TPM which is usually undesirable from a privacy viewpoint. The TPM is therefore preferably arranged to generate a succession of AIKs each of which is vouched for by a trusted party (in the present instance the IT department of an enterprise) as belonging to a valid TPM. The trusted party vouches for the AIK by providing a signed certificate for the public part of the AIK.

Figure 3:
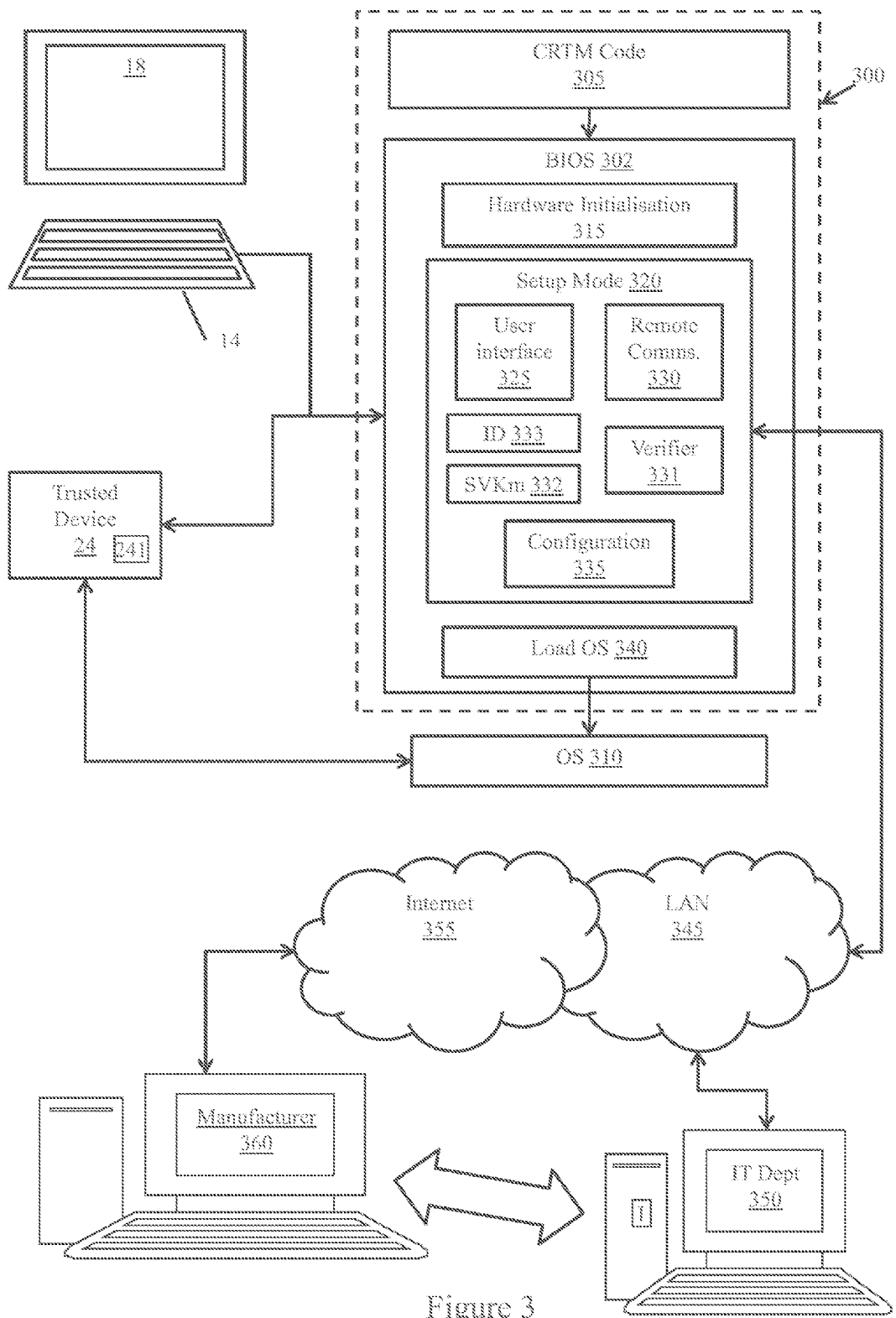
FIG. 3 is a functional block diagram indicating the functional elements of trusted boot process according to embodiments of the present invention.

FIG. 3 shows a boot process 300 comprising a BIOS program 302 and a CRTM code 305 that calls the BIOS (although the CRTM code is shown (for convenience only) functionally as part of the trusted boot process 300, as already described it physically resides in the trusted component 24). The BIOS 302 calls an OS 310. The BIOS 302 is shown to comprise hardware initialisation routines 315, a setup mode routine 320 and an OS loader routine 340. Other known and standard parts of the BIOS, for example the measurement functionalities, are not described in order not to obscure important features of embodiments of the invention. The boot process 300, or more particularly the BIOS 302, receives interrupt signals from the keyboard 14, sends visual display information to the VDU 18 and can, if required, interact with the trusted component 24. According to the embodiments to be described below, the trusted component is a hardware TPM according to a TGC standard; though embodiments of the present invention are in no way limited to operating with TPMs. In addition, embodiments described below are described with reference to a single OS trusted platform. However, as already indicated, the principles apply equally to compartmentalised computer systems running plural OS compartments, and to virtual platforms under the control of a hypervisor.

The setup routine 320 comprises a user interface function 325, which provides a user interface to allow a physically present operator to press a key or keys, on an initialised keyboard 14, in order to interrupt the BIOS program 302 and enter into the setup mode. The option to interrupt the BIOS 302 in this way typically only lasts for a few seconds, and is indicated by a message displayed in an initialised VDU 18. If the operator presses the respective keys, then the setup mode is entered. In this mode, the operator is provided by the user interface 325 with options for configuring trust attributes of the trusted platform 10. Options include modifying flags to control the operating state (signified by reference numeral 241) of the trusted component 24 (for example deactivating the trusted component, starting it including resetting the PCR values and using PCR values that were previously saved on power-down) or its ownership. Various different or additional options may be available.

According to an embodiment of the present invention to be described, the user interface 325 may also in addition, or alternatively, include options for controlling how the TPM will cooperate with an IT department in enrolling an AIK and/or the option of enrolling an AIK of the platform 10 into the PKI of an enterprise.

According to an embodiment of the present invention, the setup mode routine 320 also comprises a remote communications routine 330. The remote communications routine 330 controls interactions, during the boot process, between the trusted platform and remote computer systems in order to control the trust attributes of the platform 10. Once the BIOS 302 has determined that a user has agreed to permit a particular operation that involves remote communications, the BIOS may immediately use remote communications routine 330 to control interactions to perform that operation. Alternatively, as already alluded to above, the BIOS 302 may instruct a System Management function that is equivalent to the remote communications routine 330 (or, indeed, uses the remote communications routine 330) to control interactions to perform that operation after the OS is executing. Alternatively and/or additionally, the BIOS 302 may set a flag, such as a deferred Physical Presence flag, in the TPM to Indicate to the TPM that the user has agreed to permit a particular operation. Once the OS is executing, the trusted device may then inspect that flag before performing its part in the particular operation.

More particularly according to an embodiment of the present invention, the remote communications routine 330 enables a trusted platform to communicate (via an initialised network interface card 23), a local area network (LAN) 345 and the Internet 355 with one or more remote computer systems. According to embodiments to be described herein, one remote computer system 350 is controlled by an IT department of an enterprise that has taken ownership of the platform 10 and another remote computer system 360 is controlled by an OEM that manufactured the platform (or, of course, any proxy trusted by the OEM). The IT department computer 350 is shown to include a configuration setting I, which it will use to set the operating state of die TPM. The setup mode routine 320 also comprises a verifier routine 331, which is employed to verify that received communications are from an expected remote system. Verification typically involves using a verifier comprising a stored signature verification key SVKm 332 to verify messages from remote systems that have been signed by the respective systems' signing key SK. In other embodiments, a verification system could use symmetric cryptography, in which case the verification key and the signing key would be die same (although, as will be appreciated, this would require protection of the verification key in the platform). Messages sent by the setup mode routine 320 identify the platform using a stored identifier ID 333, which may be a serial number or any other suitable identifier. Finally, the setup mode routine 320 comprises a configuration routine 335, which is arranged to set the respective trust attribute, as will be described in detail below.

Figure 4A:
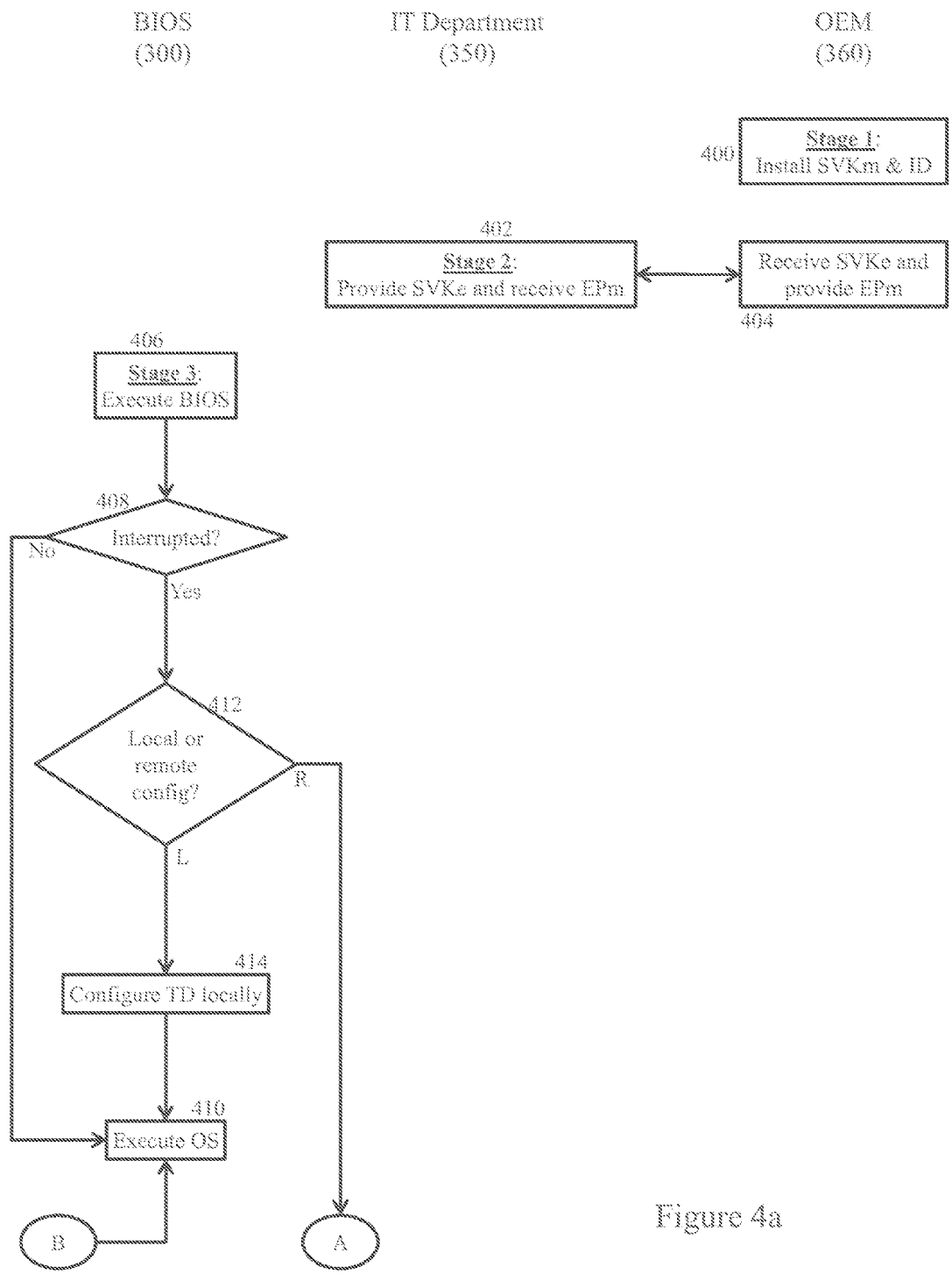
FIG. 4 is a flow chart illustrating steps involved in configuring trust attributes of a computing platform according to an embodiment of the invention.
Figure 4B:
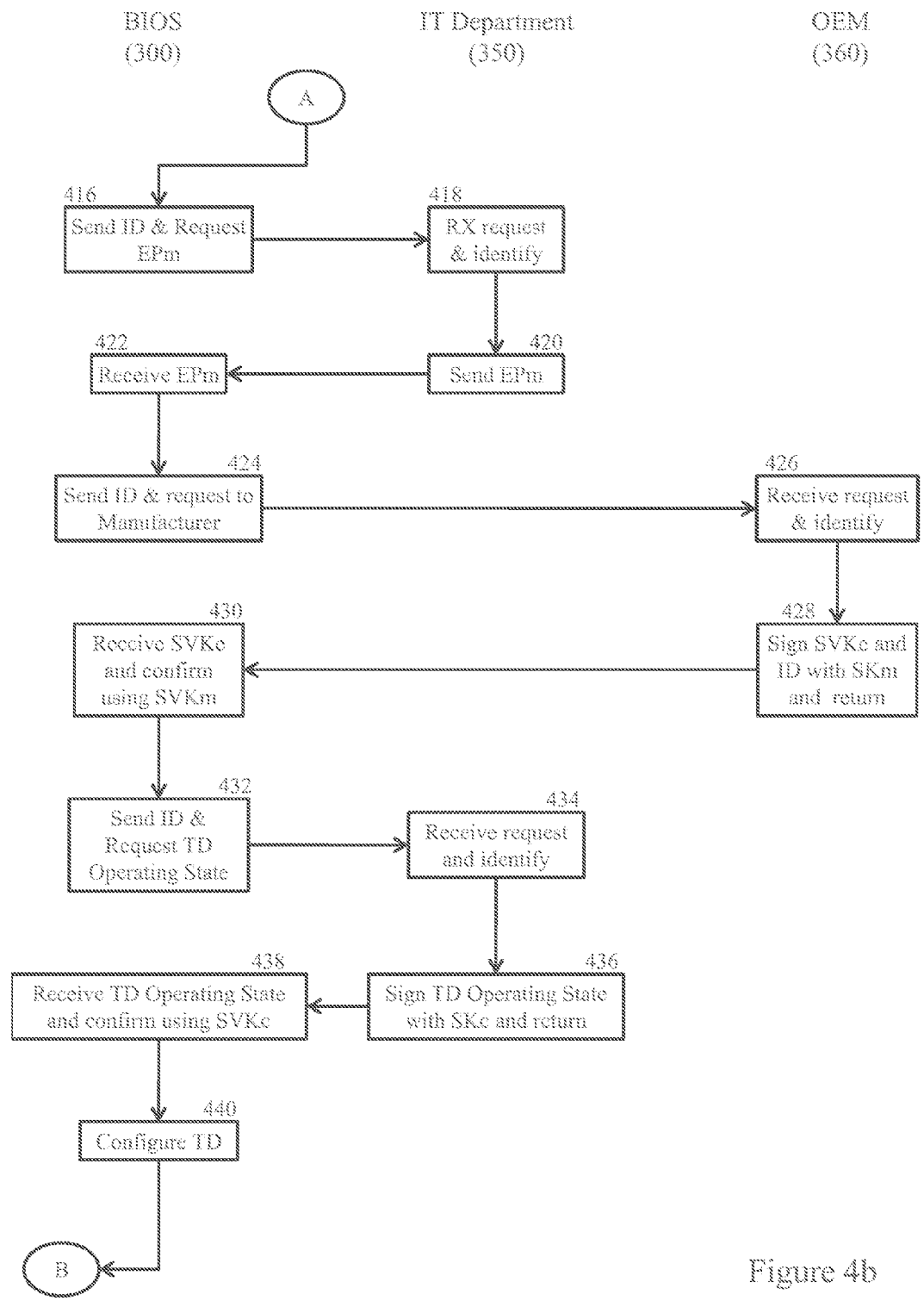

A first exemplary embodiment for configuring trust attributes of a trusted platform 10, having a trusted boot process 300 according to an embodiment of the present invention, involving a remote 11 department computer 350 setting the operating state of a trusted component 24, will now be described with reference to the flow diagram in FIG. 4. The process has three stages.

In a first stage, a trusted platform OEM produces a trusted platform 10, including installing [step 400] a trusted component 24 and a trusted boot process (according to FIG. 3), having the signature verification key (SVKm) 332 of the OEM and an identifier (ID) 333 of the platform, into the BIOS memory 29.

In a second stage, assuming that the enterprise intends to use the signature verification key (SVKm) 332 of the OEM, an IT department of an enterprise and the OEM agree that the IT department will in future be approved for remotely configuring the operating state of trusted components that are in trusted platforms that the enterprise purchases from the OEM. As part of the agreement, the IT department provides [402] the OEM with a verifier comprising a signature verification key SVKe of the enterprise, which can be used to authenticate messages signed using a counterpart signing key SKe of the enterprise, and the OEM provides [404] the IT department with endpoint information EPm that enables communication with the OEM computer 360. The IT department computer 350 is loaded with the endpoint information EPm and the OEM computer 360 is loaded with the signing key SKm and the signature verification key SVKe. Herein, references to an "OEM computer" and/or an "IT department computer" (or respective equivalents) should each be taken to encompass one or plural computers that fulfill the same tasks as the single computer. In addition, unless the context dictates otherwise, references to the OEM or the IT department (or the respective enterprise) should be taken to mean the respective computer or computers.

In a third stage, a trusted platform 10 is purchased from the OEM by the enterprise, and delivered directly to the intended recipient employee operator. The operator performs normal initialisation procedures, such as installing any extra firmware and/or software demanded by the enterprise, connecting to the enterprise LAN 345, and initialising any passwords and/or keys demanded by the enterprise. The operator switches the trusted platform 10 on, causing execution of the trusted boot process 300 including the BIOS 302 [406]. When provided with a respective visual prompt, the operator presses the required keyboard key to interrupt the BIOS execution and enter the setup routine 320 [408]. Any other appropriate interrupt operation would suffice. In the absence of the interrupt, the BIOS completes its standard initialising tasks and the load OS routine 340 loads the OS [410]. However, having entered the setup routine 320, the operator is provided with options by the user interface routine 325 to set the trusted operating mode locally himself or remotely (by the IT department). In this example, it is assumed company policy dictates that the operator selects the remote mode. However, if local mode is selected, configuration of the operating state of the misted component is completed [414] according to the prior art, and the OS executes [410]. Local configuration would be the only option available to an individual or any other party which had not acquired the authorisation from the OEM to enact remote configuration.

After the operator selects the remote configuration option, the remote communications routine 330 generates and sends a message to the IT department 350 [416] requesting endpoint information EPm of the OEM. The request includes the ID 333 of the trusted platform 10, which is sufficient for the IT department to provide the EPm. According to the present embodiment, the EPm comprises information on how the trusted platform 10 can communicate with the OEM 360. According to one embodiment, the BIOS 302 already incorporates the code necessary to handle the communications and the EPm comprises an IP address of the OEM 360. In another embodiment, the EPm comprises the code and the IP address. In addition, or alternatively, the EPm may include any other information or code necessary to facilitate communications with the OEM 360. In some embodiments, the EPm may be written into the BIOS during manufacture, obviating the steps of passing the EPm to the IT department and requesting the EPm from it. However, while the process may be simplified as a result, there may be reduced flexibility for the OEM to modify its own system and the EPm down the line.

Next [418], the IT department 350 receives the request and identifies the originating trusted platform 10 using the ID 333. If identified, the IT department 350 sends the EPm to the trusted platform [420]. It is assumed that the OEM knows the IDs of all the trusted platforms that it produces, and that the OEM 360 has a record of those IDs. Likewise, it is assumed that the IT department knows all the IDs of trusted platforms that it purchases, and that the IT department has a record of those IDs. Although not shown in the How diagram (in order to simplify the diagrams and explanations only), any failed authentication or check step in the present process causes an exception, that is handled according to wed known procedures, at least a part of which would typically be failure of the process, some kind of notification to the operator and, preferably, a notification (for example, an audit record) to the IT department.

The remote communications routine 330 receives the EPm [422] and sends a request, including the ID 333, to the OEM 360 [424] using the EPm. The OEM 360 receives the request and identities the originating trusted platform using the ID 333 [426]. In response, the OEM 360 signs a doublet comprising SVKe and ID 333 with its own signature key, SKm, and returns the SVKe and the resulting signature to the platform 10 [428]. The remote communications routine 330 receives the signed key SVKe and ID 333 and the verifier routine 331 confirms that it originates from the OEM [430], by using the SVKm 332 that was installed into the BIOS during manufacture, and that the ID 333 is that of the trusted platform 10.

In an alternative to steps 424-430, for example, in response to a request from the ST department, the OEM 360 signs the SVKe with the OEM's signature key, SKm, and provides it to the IT department 350. The IT department 350 then forwards that SVKe and signature to the trusted platform 10. This may be more convenient, for example, in instances wherein the IT department 350 is operable to interact with the OEM 360, while the BIOS 302 is only operable to interact with the 11 department 350 or, otherwise, within the bounds of the LAN 345 or an associated gateway or firewall. However, this approach may be less safe, because the message is not personalised for the trusted platform 10, but may still be safe enough if the trusted platform's SVKm 332 has been personalised for a particular enterprise, so that a trusted platform will not recognise all signatures created by the OEM.

In any event, it will be appreciated that this process [424-430] has general application for obtaining the identity of a trustable remote computer, either directly or indirectly from a pre-defined, trusted computer.

Next, the remote communications routine 330 generates and sends to the IT department 350 a message including the ID 333 and requesting a trusted component operating state indicator I [432]. The indicator I typically defines which configuration flags of the trusted component 24 should be set. The IT department 350 receives the message and identifies the originating trusted platform using the ID [434]. In response, the IT department 350 signs the indicator I with its signing key SKe and returns the indicator I and the signature to the trusted, platform [436]. Alternatively the IT department 350 might broadcast a message to multiple or all trusted platforms, containing the indicator I signed by the IT department's SKe, and omitting individual platform IDs, or indicating a set of individual platform IDs. The remote communications routine 330 receives the indicator I and the verifier routine 331 confirms that it has originated from the IT department (and, by implication, that the Ff department has previously been authorised by the OEM to enact remote configuration) by confirming the indicator using the SVKe, that was received from the OEM 360 or IT department 350.

Next [440], if authorised, the configuration routine 335 of the BIOS 302 configures the trusted component 24 in the usual way (that is, as if the configuration were provided by a physically present operator), by setting the flags according to the indicator I. Finally, the OS 310 executes after being loaded [410] by the OS loader 340.

An advantage of the foregoing embodiment is that confidence to permit remote configuration is provided by a trusted third party, messages from which can be recognised by the BIOS, which has a pre-stored SVK of the trusted third party. The natural trusted third party to select is the OEM that manufactured the trusted platform: if an enterprise did not trust the OEM then it would not buy trusted platforms from the OEM in the first place. However, as indicated, another third party, or proxy, approved by the OEM would typically provide the same degree of confidence. The arrangement described in effect provides a circular trust relationship—the OEM is trusted by the enterprise and the BIOS, and provides the means (the SVKe) for the BIOS to trust remote communications from the IT department, as if a member of the IT department was physically present. Of course, there is no substitute for the security provided by actual physical presence, and there remains scope for some kind of subversion in a remotely controlled process. However, it is perceived that the process is secure enough to be trusted in most enterprise situations, because an OEM cannot generally be coerced into approving rogue entities, so the mechanism cannot easily be misused and privacy cannot easily be subverted.

An exemplary embodiment for configuring trust attributes of a trusted platform, involving a remote IT department 350 enrolling the trusted platform into its PKI and providing the trusted platform with an AIK certificate, will now be described. This embodiment assumes that the trusted platform 10 is able to verify genuine messages from the IT department 350, irrespective of whether the verification method is a prior art method or in accord with the embodiment just described (involving receiving a signature verification key SVKe of the IT department from an OEM or its proxy).

In this embodiment, the OEM is able to provide a BIOS with the functionality it needs to securely request an AIK certificate from the IT department, in order that the IT department will be able to generate an AIK certificate with confidence but without using a trusted platform's Endorsement Key.

Figure 5:
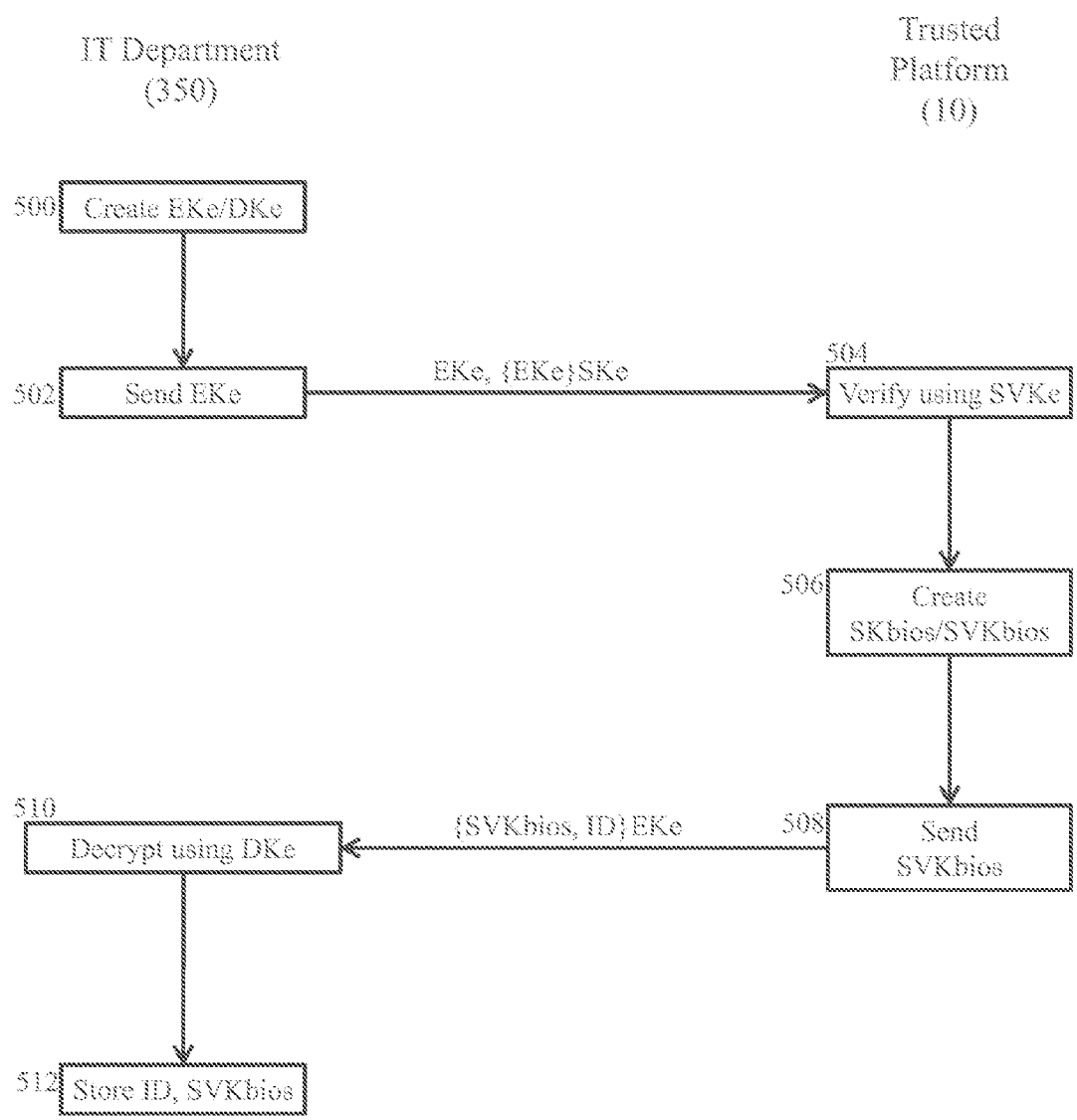
FIG. 5 is a flow chart illustrating steps involved in acquiring trust in a remote computer system according to embodiments of the invention.

The functionality can be provided to the BIOS in a number of ways, two of which are, for example:

As illustrated in FIG. 5, the IT department 350 creates an encryption/decryption key pair EKe/DKe [500], uses its SKe to sign the public encryption key portion EKe, and sends [502] it and the respective signature {EKe} in a message to the trusted platform 10. The trusted platform 10 receives and verifies [504] that the message is from the IT department using the SVKe. Then, the trusted platform 10 creates [506] a signing key/signature verification key pair SKbios/SVKbios, and then encrypts the doublet SVKbios and ID 333 using EKe and sends [508] the encrypted doublet in a message to the IT department 350. The IT department receives the message and decrypts [510] the information using DKe to recover SVKbios and the ID 333, and then stores [512] the ID 333 and SVKbios doublet for future operations.

Alternatively, in an adaptation of known prior art methods, the IT department uses its enterprise management system to install a password or key in the trusted boot process or BIOS of a trusted platform to authenticate communications from the BIOS to the IT department 350. For example, the IT department might install a signature key in the BIOS, for the BIOS to communicate with the IT department. Alternatively, as in the first example, the IT department may generate an encryption/decryption key pair EKe/DKe and sends the EKe to the trusted platform, and the trusted platform may then generate key pair SKbios/SVKbios and impart the signature verification key to the IT department.

Figure 6:
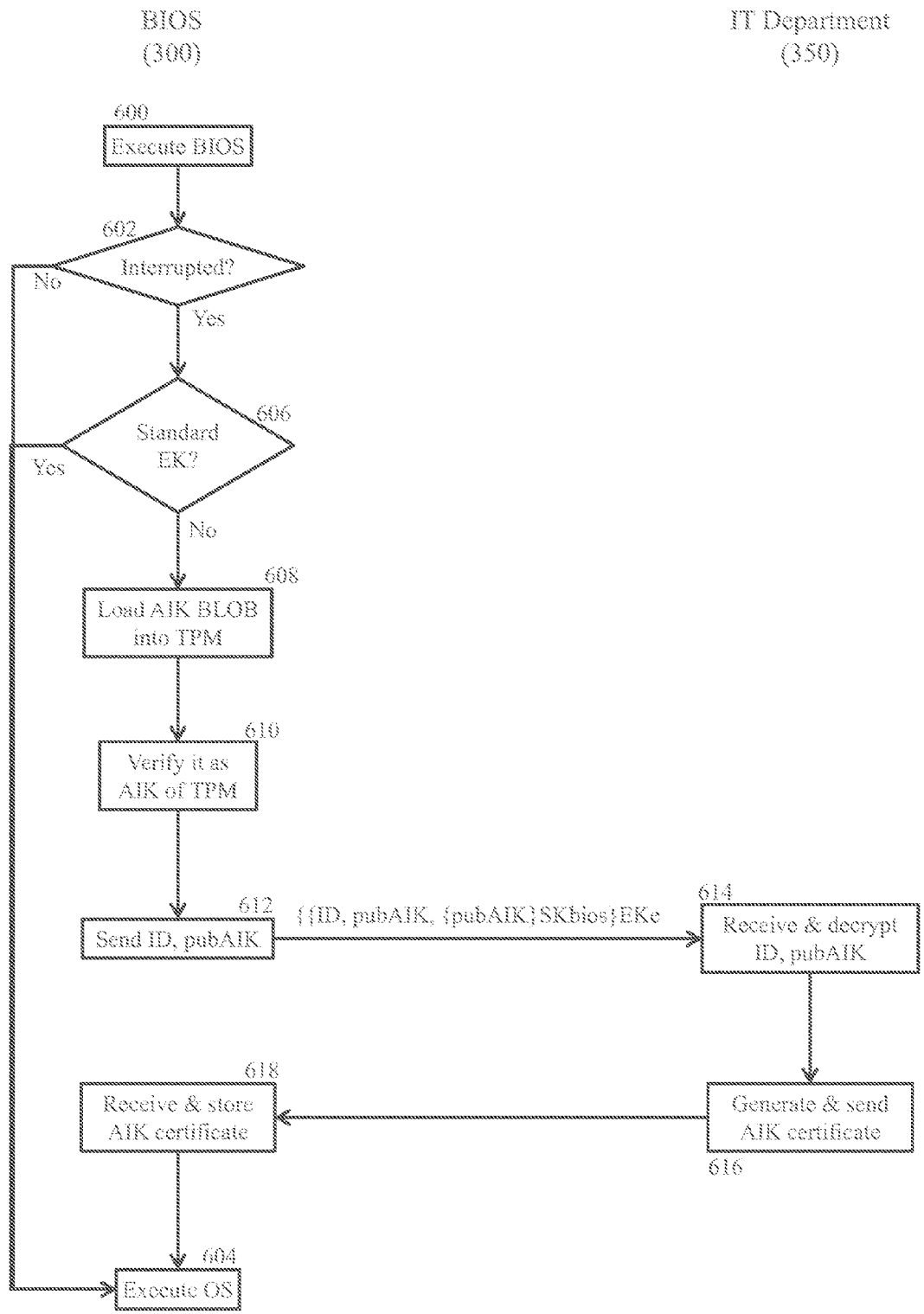
FIG. 6 is a flow chart illustrating steps revolved in enrolling a computing platform into a PKI infrastructure according to an embodiment of the present invention.

In this embodiment of the invention, with reference to the flow diagram in FIG. 6, the operator switches the trusted platform on, causing execution of the BIOS 302 [600]. When provided with a respective visual prompt, the operator has the option to press the required keyboard key to interrupt the BIOS execution and enter the setup routine 320. It will be appreciated that the PKI enrolment process may be an independent process or it could accompany the options in FIG. 4; whereby an operator may have options to set the operating state of the trusted component and enroll an AIK into the PKI of the enterprise. In the absence of the interrupt [602], the BIOS completes its standard initialising tasks and the load OS routine 340 loads the OS [604] for execution. Alternatively, if the BIOS execution has been interrupted [602] to enter the PKI setup routine, the BIOS offers the operator the choice of using the standard TOG method of AIK enrolment, which uses the platform's Endorsement Key, or the following embodiment, wherein the BIOS sends evidence to the IT department 350 that an AIK is a genuine AIK. If the operator chooses to use the standard TCG method [606], the BIOS exits the setup routine 320 and plays no further part in the forthcoming AIK enrolment. If, on the other hand, the operator chooses not to use the standard TCG method [606], the BIOS loads an AIK blob into the TPM [608], to verify that it is an AIK belonging to that TPM and sends [612] a message to the IT department containing the ID 333 and the public part of that AIK (pubAIK). The AIK key pair would have been generated by the TPM after the current owner had been installed in the TPM in the normal way.

The message, which is encrypted using EKe, contains the triplet consisting of pubAIK, a signature of pubAIK created using SKbios (providing evidence from the BIOS that the AIK is a genuine AIK), and ID 333. The IT department 350 receives the message [614], decrypts the triplet, using its decryption key DKe, and verifies the pubAIK signature using the SVKbios corresponding to the ID 333.

Although not shown, in a variant to the present embodiment, the BIOS can also cause the TPM to sign the pubAIK using the privAIK, and then sign that signature with its SKbios. This is because PKI servers may be configured to accept self-signed certificate requests.

In any event, the IT department 350 passes the pubAIK (and, in the variant, the self-signed pubAIK) to the enterprise's PKI infrastructure, then uses its PKI infrastructure to generate an AIK certificate in a known way and returns the AIK certificate to the trusted platform [616]. The BIOS 300 receives the certificate and stores it [618] in association with the respective AIK pair, to be used in future interactions with third parties. Finally, the OS loader routine 340 loads the OS [604], which then executes.

A key additional advantage of the foregoing process is that it is more compatible with known processes for enrolling a trusted platform into a PKI (the details of which will not be described herein). Again the process is facilitated by a circular trust relationship between the BIOS, the IT department and the OEM, or between the BIOS and the IT department. In particular, in this instance, the process enables the IT department to trust the trusted platform, and, again, should be secure enough to be trusted in most enterprise situations.

Many alternatives or variants to the embodiments described above are possible without departing from the principles described. For example, in some embodiments of the invention, the trusted component 24 is configured during manufacture to store the SVKm, and the BIOS routine 302 is adapted to interact with the trusted component to undertake the various signing, encrypting and verification tasks. Indeed, the SKbios of the second embodiment may generated by the trusted component 24 and stored securely in the trusted component during operation. Of course, an advantage of such embodiments is that the trusted component is designed for cryptographic operations and the BIOS can thus be simpler. In general terms, the secure boot process in FIG. 3 comprises various functions and routines that could be partitioned in many different ways, it being important to recognise that the arrangement shown in FIG. 3 is just one of many possible options. Also, as already indicated, the arrangement in FIG. 3 could be adapted for a hypervisor-controlled system supporting plural virtual computing platforms. In this case, configuration of the operating state of the trusted component would typically relate to a hardware trusted component that operates with the hypervisor, whereas PKI enrolment may be enacted at both the compartment and the compartment level (it being probable that different compartments and respective operators would require different sets of AIKs and certificates). Of course, many alternative arrangements are conceivable on the basis of the present disclosure.

The invention claimed is:

1. A computing platform storing a verifier for verifying messages from a remote computer system and being operable to:
    generate an Attestation Identity Key (AIK) key pair;
    send to the remote computer system a message comprising a public key portion of the AIK key pair and evidence that the public key portion of the AIK key pair originates from the computing platform;
    store an AIK certificate, which is received from the remote system and is associated with the AIK key pair; and
    undertake trustable communications with the remote computer system to encrypt the signature verification key using a verified encryption key and impart the signature verification key in encrypted form to the remote computer system.

2. A computing platform according to claim 1, wherein the evidence comprises a signature of the public key portion of the AIK key pair generated using a signing key of the computing platform, the computing platform operable to generate a respective signing key/signature verification key pair.

3. A computing platform according to claim 1, wherein the trustable communications includes verifiably receiving the encryption key.

4. A computing platform according to claim 3, wherein the encryption key is verified using a second verifier, which is received from a trusted remote source.

5. A computing platform according to claim 1, comprising a trusted boot process, which is operable to acquire the AIK certificate.

6. A computing platform according to claim 1, comprising a System Management function, which is operable to acquire the AIK certificate.

7. A computing platform comprising a Trusted Platform Module (TPM), storing a verifier for verifying messages from a remote computer system, and being operable to:
    generate an Attestation Identity Key (AIK) key pair;
    send to the remote computer system a message comprising a public key portion of the AIK key pair and evidence that the public key portion of the AIK key pair originates from the computing platform; and
    store an AIK certificate, which is received from the remote system and is associated with the AIK key pair,
    wherein the AIK key pair is stored in an opaque blob, and
    wherein the TPM is adapted to load the opaque blob and release to the computing platform at least the public key part of the AIK key pair, to be sent to the remote computer system.

8. A computing platform comprising a trusted boot process, which is operable to permit enrollment of the computing platform into a Public Key Infrastructure (PKI) infrastructure including by acquiring the AIK certificate, storing a verifier for verifying messages from a remote computer system, and being operable to:
    generate an Attestation Identity Key (AIK) key pair;
    send to the remote computer system a message comprising a public key portion of the AIK key pair and evidence that the public key portion of the AIK key pair originates from the computing platform; and
    store an AIK certificate, which is received from the remote system and is associated with the AIK key pair,
    wherein the trusted boot process is operable to provide an operator interface, for selectively permitting enrolment into the PKI infrastructure including by obtaining the AIK certificate using either a signed public key portion of the AIK key pair or an endorsement key of the computing platform.

* * * * *